(No Model.) 3 Sheets—Sheet 1.

D. GOFF.
SMOKE AND GAS RETURNING APPARATUS.

No. 579,644. Patented Mar. 30, 1897.

WITNESSES:
P. H. Nagle
L. Druville

INVENTOR
Daniel Goff
BY Joshua Biberstein
ATTORNEY.

(No Model.) 3 Sheets—Sheet 2.
D. GOFF.
SMOKE AND GAS RETURNING APPARATUS.
No. 579,644. Patented Mar. 30, 1897.
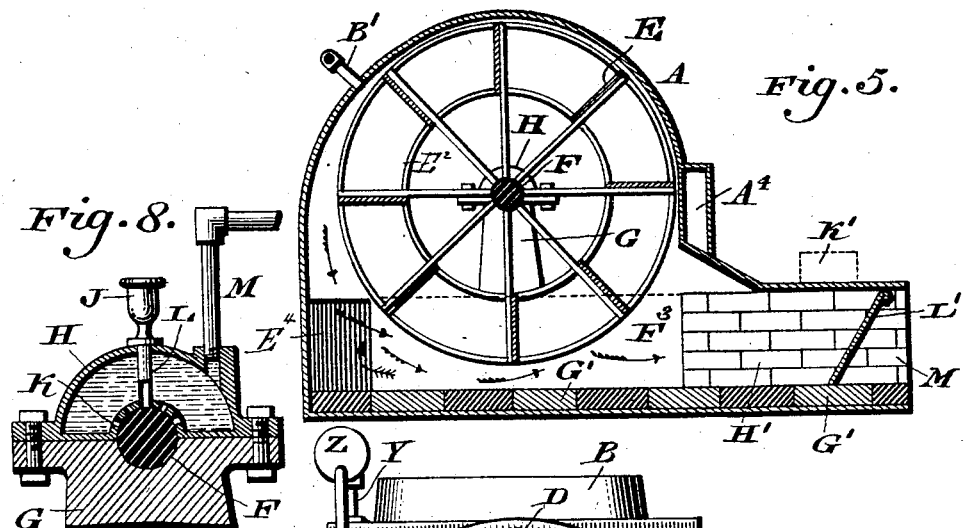
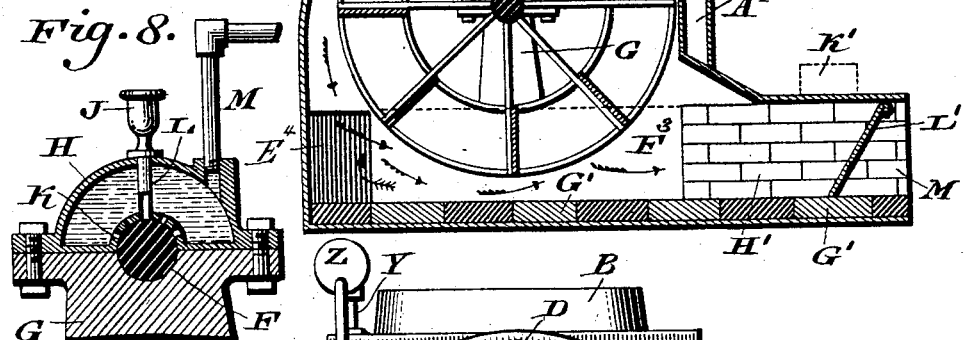
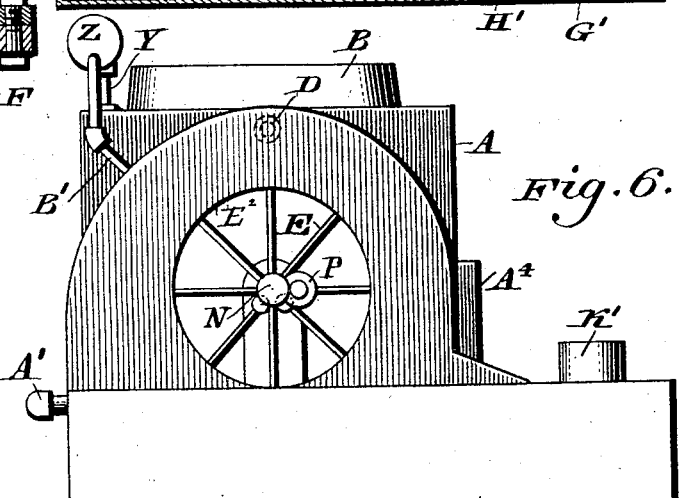
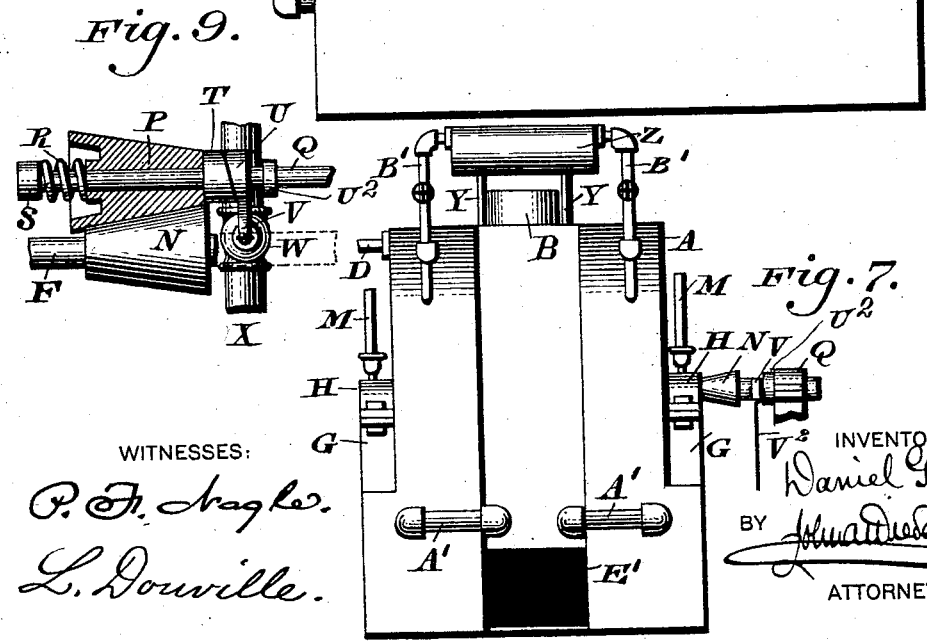

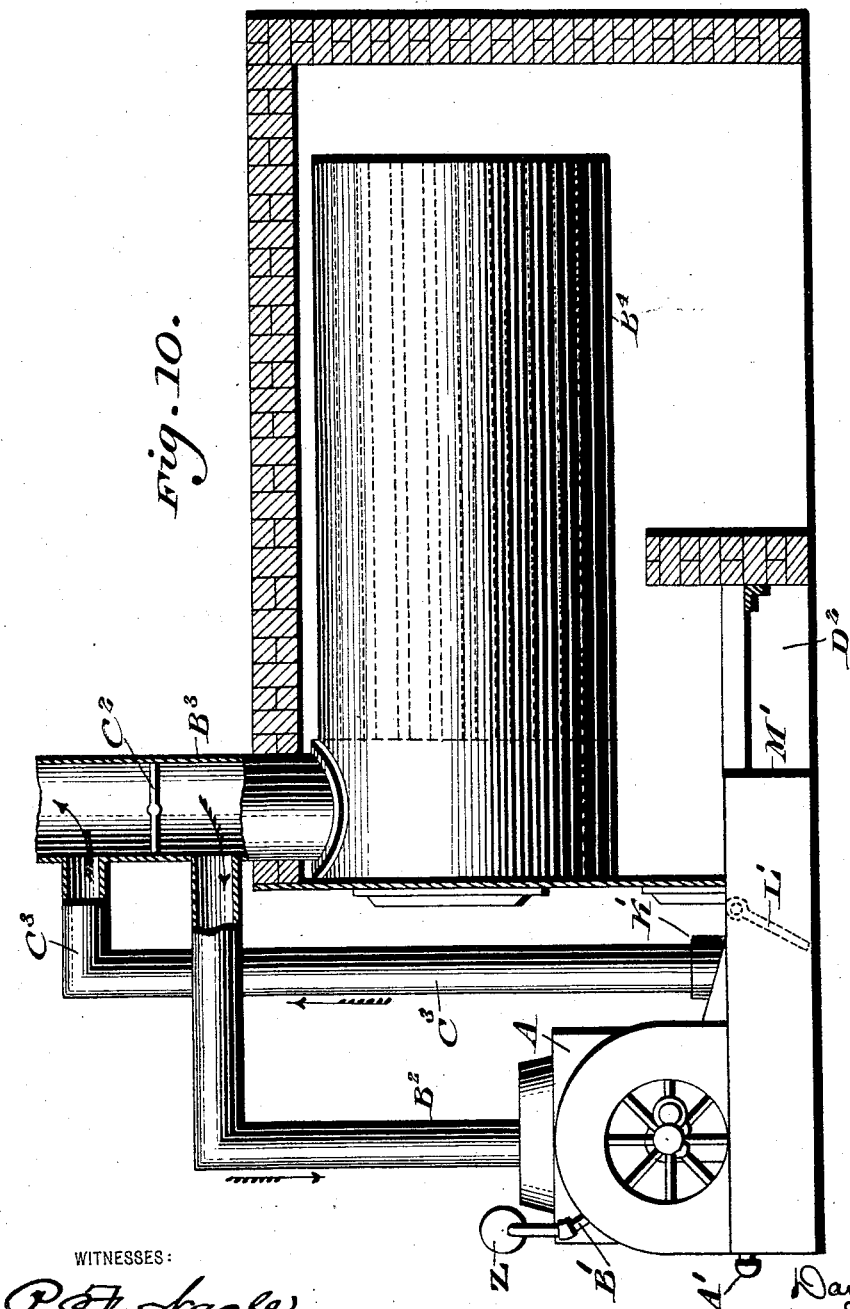

UNITED STATES PATENT OFFICE.

DANIEL GOFF, OF MILLVILLE, NEW JERSEY.

SMOKE AND GAS RETURNING APPARATUS.

SPECIFICATION forming part of Letters Patent No. 579,644, dated March 30, 1897.

Application filed February 24, 1896. Serial No. 580,322. (No model.)

*To all whom it may concern:*

Be it known that I, DANIEL GOFF, a citizen of the United States, residing at Millville, in the county of Cumberland, State of New Jersey, have invented a new and useful Improvement in Smoke and Gas Returning Apparatus for Furnaces, &c., which improvement is fully set forth in the following specification and accompanying drawings.

My invention consists of a novel construction of smoke and gas returning apparatus for furnaces, &c., in which means are provided for cooling such portions of the same as are exposed to the greatest heat and for protecting the shaft on which the fans or blowers are mounted.

It further consists of means for automatically regulating the speed of the blower and of devices for conducting either pure air into the furnace for the support of combustion or commingling smoke and air, as may be desired, prior to their return to the furnace, provision being further made for directing said commingled smoke and air to other points, if desired.

It further consists of novel details of construction, all as will be hereinafter set forth, and specifically pointed out in the claims.

Figure 1:
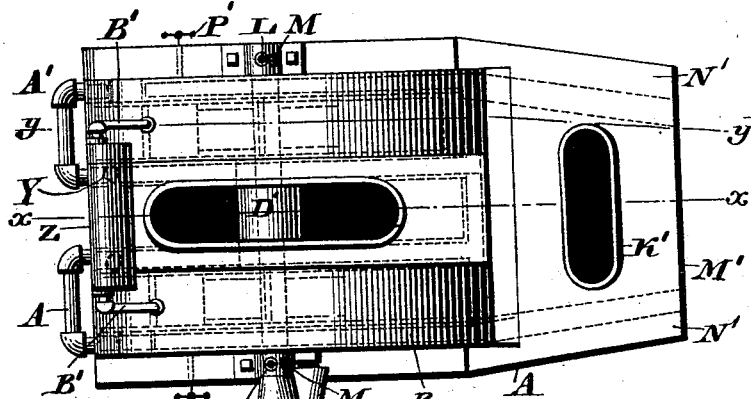
Figure 2:
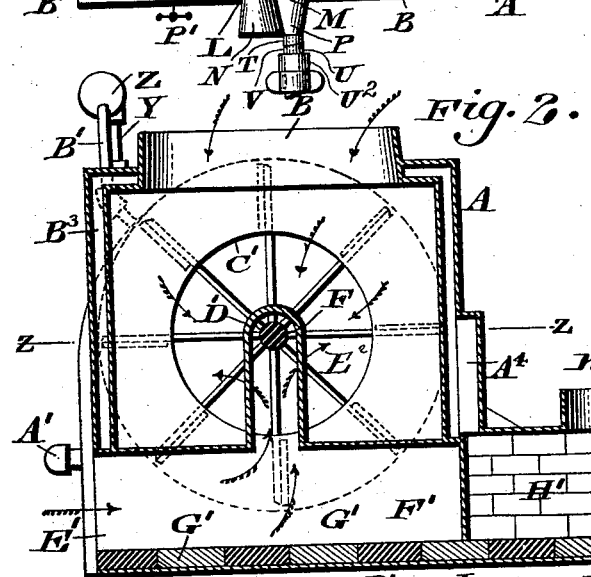
Figure 4:
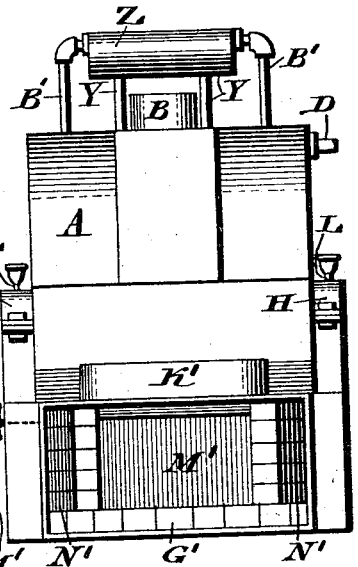
Figure 3:
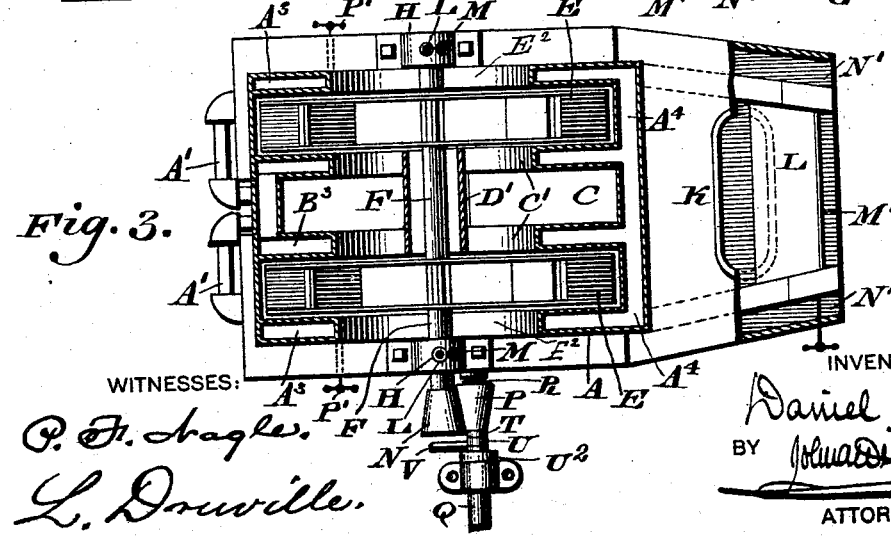

Figure 1 represents a plan view of a smoke and gas returning apparatus and its adjuncts embodying my invention. Fig. 2 represents a central longitudinal section on line $xx$, Fig. 1. Fig. 3 represents a horizontal section on line $zz$, Fig. 2. Fig. 4 represents a front elevation of Fig. 2. Fig. 5 represents a section on line $yy$, Fig. 1. Fig. 6 represents a side elevation of the apparatus. Fig. 7 represents a rear elevation of the same. Fig. 8 represents, on an enlarged scale, a sectional view of one of the bearings for the main shaft upon which the fans are mounted, showing the manner of cooling the same. Fig. 9 represents, on an enlarged scale, a plan view, partially in section, of the mechanism for automatically regulating the speed of the blower. Fig. 10 represents a sectional view of a boiler-furnace and its adjuncts, showing the connections from the stack to the inlet and outlet of the blower.

Similar letters of reference indicate corresponding parts in the several figures.

Referring to the drawings, A designates the smoke and gas returning apparatus, the same consisting of a suitable inclosing casing, which has the inlet B at its top portion, into which the smoke and products of combustion are initially conducted, the same being led therefrom through the passage C', as seen in Fig. 2, to the central chamber C, as will be hereinafter explained.

E designates fans or blowers which are mounted upon the shaft F, said fans being in the present instance two in number, although it is evident that the number of the same may be increased, if desired. The said shaft F has part of its bearing in the post or standard G, while the other portion of the bearing H is made hollow for the reception of water or other cooling fluid, and is provided with the perforations K, whereby the same is admitted to the shaft F, oil being also introduced thereupon through the tube L and the oil-cup J, which may be of any suitable construction, the cooling fluid being introduced into the cap H through the pipe M.

N designates a friction-cone which is mounted upon the shaft F, and is adapted to normally contact with a similarly-shaped friction-cone P, which is longitudinally movable upon the shaft Q, which latter is rotated by any suitable means.

R designates a spring intermediate said pulley P and the collar S, whereby said pulleys are normally held in contact, as will be evident from Fig. 9.

T designates a collar which is loosely mounted upon the shaft Q and has abutting against it a loose collar U, the latter having its movement limited by the fixed abutment $U^2$, with which said collar contacts, the abutting faces of the same being cut at an angle to the longitudinal axis of said shaft Q, and said latter collar U being provided with an arm V, which is adapted to have a connection $V^2$, leading to the valve-stem of a suitable valve W, which may be a safety-valve of any desired construction in which any variation of pressure causes a reciprocal movement to be imparted to its stem, said valve being located in the steam-main X, as will be best understood from Fig. 9, whereupon it will be understood that any variation in the pressure in the steam-main will actuate the stem of the valve W, and in so doing by reason of the movement of the abutting faces of the collars T and U with respect to each other the cone P will be caused to move a slight distance toward or away from the cone N, and the speed of rotation of the latter will be correspondingly lessened, it being noted that the action is automatic and requires no attention from the attendant, and that any increase of pressure in the steam-pipe X will cause a corresponding reduction of the speed of the fan E.

D designates an inlet-pipe for the water-jackets $A^3$ and $A^4$, which are located within the casing of the apparatus, the said water-jackets $A^3$ having pipes Y extending upwardly therefrom and leading into the drum Z, from which depends the pipes B', which have their exits communicating with the casing A, in proximity to the fans E, whereby it will be seen that the steam generated within said jackets $A^3$ and $A^4$ will be conducted through the pipes Y, drum Z, and pipes B' and discharge upon the fans, thus keeping the same always cool, it being understood that said pipes B' may be provided with suitable valves according to requirements.

D' designates a suitable casing or housing which extends around and protects the shaft F, the extent of the same being best understood from Figs. 2 and 3, whereupon it will be seen that the hot gases and products of combustion are prevented from acting upon and injuring said shaft, the same being conducted directly through the passages C' into the fan-chambers.

$B^3$ designates a water-jacket located in the central rear portion of the apparatus, as will be best understood from Fig. 3, said jacket $B^3$ being connected with the adjacent jackets $A^3$ through the medium of the pipes A'.

E' designates a passage in the rear of the furnace, which is normally open and leads to the substantially centrally-located chamber F', the latter having its bottom lined with firebrick or similar material. The fresh air is drawn in through the outer passages $E^2$ during the rotation of the fans and a portion of it is discharged through the passages $E^4$ under each fan into the longitudinally-extending conduits, the location of the above passages being readily understood from Figs. 1, 3, and 5, it being seen that purer air is discharged through the passages N' than through the exit M'.

The fresh air which is drawn in through the passage E' follows the course of the arrows in Fig. 2, and is discharged upwardly into the fan-chambers, thus commingling with the smoke and products of combustion which enter the apparatus through the pipe $B^2$, (seen in Fig. 10,) said pipe leading from the stack $B^3$ of the boiler $B^4$, which is inclosed in suitable masonry.

$C^2$ designates a suitable damper in the stack $B^3$, from above which damper the pipe $C^3$ leads to the nozzle K'.

The commingled air and smoke is discharged into the chamber H' and thence through the exit M' into the ash-pit $D^2$ of the boiler-furnace, as seen in Fig. 10, it being evident that by the proper manipulation of the dampers L' and $C^2$ the hot gases can be withdrawn from the stack $B^3$ through the pipe $B^2$, and after passing through the fan can be directed out of the stack through the pipe $C^3$ into the ash-pit through the exit M', and that, further, all the gases can be withdrawn from the stack or only a portion of the same.

Through the medium of the conduits N' and the passage $E^4$ purer air can be discharged therethrough than out the exit M', it being apparent that by properly manipulating the damper L' smoke and commingled gases can be discharged through the exit M', or nearly pure air alone can be discharged through the passages N', assuming the damper L' to be in the position seen in Fig. 2.

The operation is as follows: The water or other cooling medium is introduced through the pipe D into the chambers $A^3$ and $A^4$, and also the chambers $B^3$ through the medium of the connections A', and the same becoming vaporized is conducted to the drum Z and thence through the pipes B' to the fan-chambers, steam being thus discharged upon the fans, as is evident, whereby the same are kept cool under all conditions. The smoke and other products of combustion are conducted into the apparatus through the central inlet B, and thence downwardly through the central chamber C, and from there into the fan-chambers at either side thereof through the passages C', air being introduced through the rear inlet E' and side openings $E^2$, as indicated by the arrows in Fig. 2, it being noted that the shaft F is protected from direct contact with said highly-heated products of combustion. The commingled smoke and air is now forced into the passage H', and thence through either the outlet M' or K', according in whichever position the damper L' is set, partially pure air being also forced out of the passages N' on either side of the central discharge M', as will be understood from Fig. 3, said air being taken in through the openings $E^2$ at the exterior of the casing on either side and afterward discharged through the passages $E^4$ into the conduits N', it being evident that said air will be commingled with less of the smoke and products of combustion than the air discharged through the exit M'.

The bearings for the shaft F, which carries the fans, are kept cool by the introduction of water thereinto by the pipe M, while oil or other lubricant can be introduced to said shaft through the medium of the oil-tube L.

The manner of actuating the shaft F has already been described and will be readily understood from Figs. 1, 3, and 9, power being applied initially to the shaft Q and transmitted thence to the fans through the medium of the friction-cones to said shaft F.

It will be understood that dampers P' may be employed in order to regulate the incoming currents of air, and the passages N' may also have dampers therein, and that various other changes and modifications may be made which will come within the spirit of my invention, and I therefore reserve the right to make such changes which will come within the scope of my invention.

Having thus described my invention, what I claim as new, and desire to secure by Letters Patent, is—

1. In a smoke and gas returning apparatus, a shaft having a plurality of fans mounted thereupon, a separate inlet-passage for smoke and pure air intermediate said fans, a substantially central discharge-passage for commingled air and smoke, and conduits for the discharge of purer air adjacent said passage, in combination with a boiler-furnace having passages leading from the stack and ash-pit to said fans.

2. In a smoke and gas returning apparatus, an inclosing casing, a shaft having a plurality of fans mounted thereupon, a separate inlet-passage for smoke and purer air intermediate said fans, a substantially central discharge-passage for commingled air and smoke, conduits for the discharge of purer air adjacent said passage, openings in the sides of said casing for the admission of pure air, and means for conducting the latter to said conduits.

3. In a smoke and gas returning apparatus, a main shaft, a plurality of fans mounted thereon, a friction-cone mounted on said shaft, a second shaft adjacent thereto, a friction-cone adapted to be in contact with said former cone, a collar mounted on the latter shaft, a spring interposed between said collar and the latter cone, a plurality of collars mounted adjacent said spring-pressed cone, and having their abutting edges at an angle to the axis of their shaft, an arm attached to one of said collars, an abutment for the latter, and a connection from said arm adapted to be actuated by the rise and fall of pressure in a steam-main.

4. In a smoke and gas returning apparatus, a main shaft, a plurality of fans mounted near opposite ends thereof, a hood surrounding the central portion of said shaft, a substantially central opening for the ingress of the products of combustion, a substantially central opening in the lower portion for the ingress of the atmosphere, other openings for the ingress of the atmosphere, and a substantially central discharge for the commingled smoke and gases, in combination with a passage at either side thereof for the discharge of purer air, and a damper located in said central passage.

5. In a smoke and gas returning apparatus, a shaft, a plurality of fans mounted thereupon, a casing for said fans, a central opening in said casing, a hood for protecting said shaft from the products of combustion, a jacket surrounding said fans, means for introducing a cooling fluid thereinto, and a discharge from the upper portion of said jackets leading to said fan-chambers.

6. In a smoke and gas returning apparatus, a shaft, a plurality of fans mounted on opposite ends thereof, a casing therefor, central openings for the ingress of smoke and air, an outlet-passage therefor, a plurality of exits adjacent to said passage, and dampers controlling the same.

7. In a smoke and gas returning apparatus, a boiler-furnace having a stack provided with a damper leading therefrom, a blowing apparatus located adjacent thereto having a casing, openings in the side thereof for the admission of pure air, a shaft supported within said casing and having a plurality of fans mounted thereon, means for keeping said shaft and fans cool, central openings for the ingress of smoke and air, an outlet-passage therefor, an exit leading from said passage to the ash-pit of said furnace, a second exit having a conduit leading to a point above the damper of said stack, and a conduit leading from the latter at a point below said damper to the interior of said casing.

DANIEL GOFF.

Witnesses:
JOHN A. WIEDERSHEIM,
E. HAYWARD FAIRBANKS.